US005369412A

United States Patent [19]

Tsujimoto

[11] Patent Number: 5,369,412

[45] Date of Patent: Nov. 29, 1994

[54] SIDELOBE CANCELLATION AND DIVERSITY RECEPTION USING A SINGLE ARRAY OF AUXILIARY ANTENNAS

[75] Inventor: Ichiro Tsujimoto, Tokyo, Japan

[73] Assignee: NEC Corporation, Japan

[21] Appl. No.: 166,541

[22] Filed: Dec. 14, 1993

[30] Foreign Application Priority Data

Dec. 14, 1992 [JP] Japan ................................ 4-332866

[51] Int. Cl.[5] ............................ G01S 3/16; G01S 3/28

[52] U.S. Cl. ...................................... 342/380; 342/381

[58] Field of Search ............... 342/380, 381, 382, 383, 342/384

[56] References Cited

U.S. PATENT DOCUMENTS 4,516,126 5/1985 Masak et al. ........................ 342/383
4,586,045 4/1986 Downie .
4,771,289 9/1988 Masak ................................ 342/383

OTHER PUBLICATIONS

Applebaum, Sidney P., *IEEE Transactions on Antennas and Propagation, Adaptive Arrays*, vol. AP-24, No. 5, Sep. 1976, pp. 585-598.

*Primary Examiner*—Theodore M. Blum

*Attorney, Agent, or Firm*—Ostrolenk, Faber, Gerb & Soffen

[57] ABSTRACT

In a sidelobe canceller, a main channel multiplier (11) operates on the baseband output signal of a main antenna (10) with a weight signal to produce a weighted main channel signal. The baseband output signals of auxiliary antennas ($16_1 \sim 16_n$) are adaptively weighted so that the auxiliary antennas have a first directivity pattern (44) whose main lobe oriented toward an undesired signal and summed together to produce a first sum signal ($y_s$), and further adaptively weighted so that the auxiliary antennas have a second directivity pattern (45) whose main lobe is oriented toward a desired signal, and summed together to produce a second sum signal ($y_d$). The second sum signal ($y_d$) is summed with the weighted main channel signal to produce a diversity combined signal ($y_c$), and the first sum signal ($y_s$) is subtracted from the diversity combined signal ($y_c$) to produce a sidelobe cancelled signal ($y_z$). An adaptive equalizer (14) is provided for removing intersymbol interference from the sidelobe cancelled signal ($y_z$). The main channel weight signal is derived by correlating the output of the adaptive equalizer with the output of the main antenna.

3 Claims, 1 Drawing Sheet

SIDELOBE CANCELLATION AND DIVERSITY RECEPTION USING A SINGLE ARRAY OF AUXILIARY ANTENNAS

BACKGROUND OF THE INVENTION

1. Field of the Invention

The present invention relates to a sidelobe canceller wherein an array of auxiliary antennas is provided in addition to a main antenna for cancelling an undesired signal introduced to the main channel signal by the sidelobes of the main antenna.

2. Description of the Related Art

A prior art sidelobe canceller consists of a main antenna which is oriented to receive a desired signal and an array of auxiliary antennas. A plurality of multipliers are connected to the auxiliary antennas for weighting the outputs of the auxiliary antennas with controlled weight values. If a jamming signal, uncorrelated with the desired signal, is present in the sidelobes of the main antenna the quality of transmission is severely degraded. To provide sidelobe cancellation, the weighted signals are summed to produce a sum signal which is subtracted from the output signal of the main antenna. By using the sidelobe cancelled signal as a reference, the weights of the multipliers are updated so that the auxiliary antennas orient the main lobe of their directivity pattern toward the jamming signal source. Under this condition, the sum signal represents a replica of the jamming signal. The least mean square algorithm and the Applebaum algorithm are known in the art to derive weight coefficients. The Applebaum algorithm is one which derives the weight coefficients by introducing a steering vector to the LMS loop of the sidelobe canceller for estimating to some extent the direction of arrival of the desired signal. The weight control provided by the Applebaum algorithm maximizes the ratio (SINR) of desired to undesired signal level (interference signal plus noise).

An adaptive equalizer is used for adaptively equalizing intersymbol interference caused by a multipath fading channel. If the adaptive equalizer is used in combination with the prior art sidelobe canceller and if the time difference between the paths of the multiple fading channel is small, there is a shift in fade pattern from frequency selective fading to flat fading and the desired signal itself will be lost. This problem cannot be solved by the use of the adaptive equalizer and diversity reception would be required. In addition, since the output signals of the auxiliary antennas also contain a desired signal component, the sum signal contains it as well as the replica of the undesired signal. The sidelobe cancelled signal would severely decrease in amplitude as a result of the subtraction of the desired component from the main antenna when they are under a certain amplitude and phase relationship.

SUMMARY OF THE INVENTION

It is therefore an object of the present invention to provide a sidelobe canceller which provides sidelobe cancellation and diversity reception without increasing the auxiliary antennas.

According to the present invention, there is provided a sidelobe canceller which comprises a main antenna system for producing a baseband main channel signal and an array of auxiliary antenna systems for producing baseband auxiliary channel signals. A main channel multiplier is connected to the main antenna for operating on the main channel signal with a main channel weight signal to produce a weighted main channel signal. A plurality of first auxiliary channel multipliers are connected to the auxiliary antenna systems for respectively operating on the baseband auxiliary channel signals with sidelobe cancelling weight signals to produce first weighted auxiliary channel signals, which are summed to produce a first sum signal. A plurality of second auxiliary channel multipliers are further provided for respectively operating on the baseband auxiliary channel signals with diversity combining weight signals to produce second weighted auxiliary channel signals, which are summed to produce a second sum signal. The second sum signal is summed with the weighted main channel signal to produce a diversity combined main channel signal, and the first sum signal is subtracted from the diversity combined main channel signal to produce a sidelobe cancelled main channel signal. An adaptive equalizer is provided for removing intersymbol interference caused by a multipath fading channel from the sidelobe cancelled main channel signal. The main channel weight signal is derived by correlating the output of the adaptive equalizer with the output of the main antenna. The sidelobe cancelling weight signals are derived so that the auxiliary antennas have a first directivity pattern whose main lobe is oriented toward an undesired signal and the diversity combining weight signals are derived so that the auxiliary antennas have a second directivity pattern whose main lobe is oriented toward a desired signal.

Specifically, the sidelobe cancelling weight signals are derived by correlating the baseband auxiliary channel signals with the output signal of the sidelobe-cancelled main channel signal, and subtracting the correlation from a steering vector. On the other hand, the diversity combining weight signals are derived by correlating the baseband auxiliary channel signals with the output signal of the adaptive equalizer.

BRIEF DESCRIPTION OF THE DRAWINGS

The present invention will be described in further detail with reference to the accompanying drawings, in which.

DETAILED DESCRIPTION

Figures 1, 2:
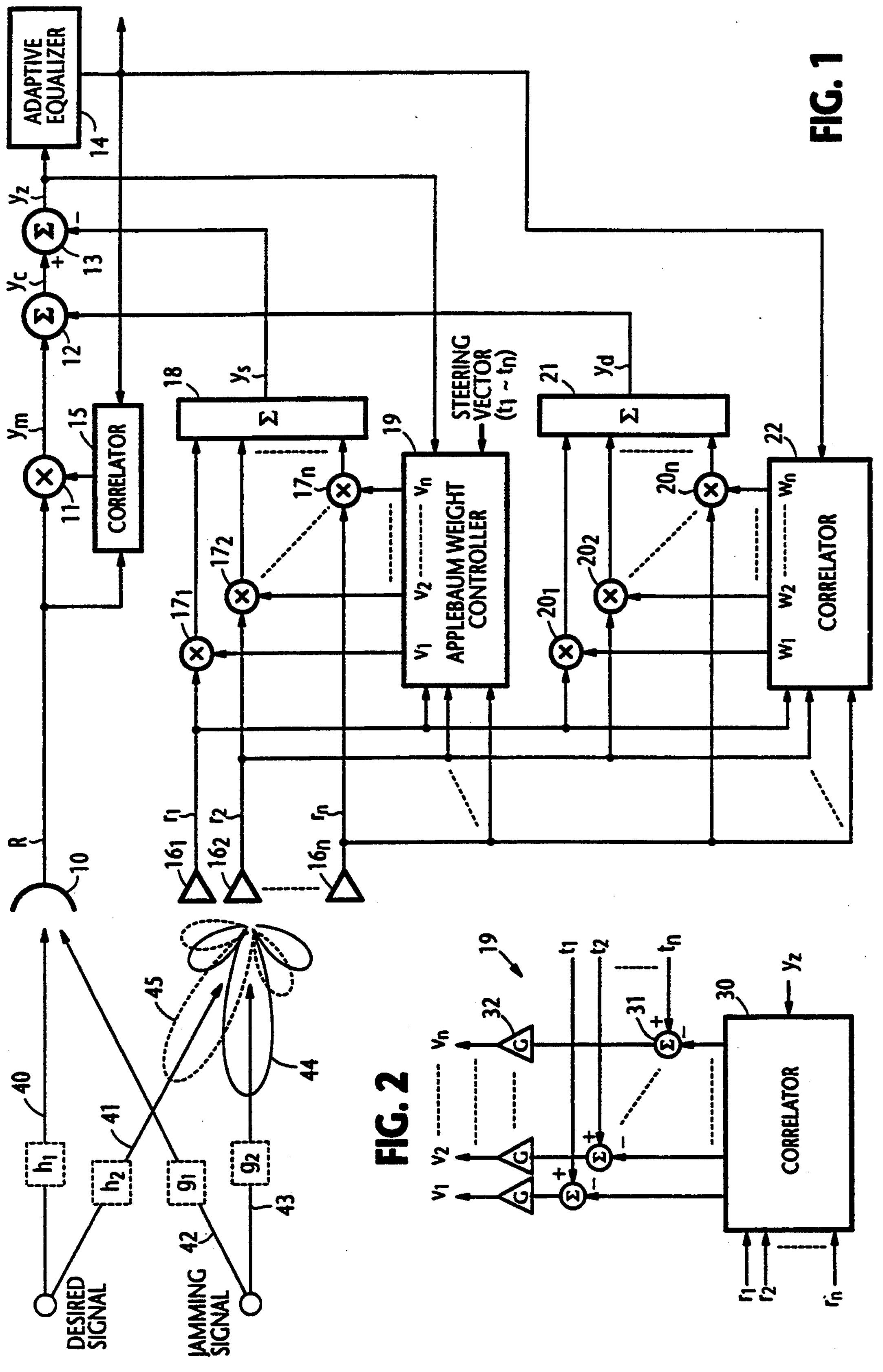
FIG. 1 is a block diagram of a sidelobe canceller according to the present invention.
FIG. 2 is a block diagram of the Applebaum weight controller of FIG. 1.

Referring now to FIG. 1, there is shown a sidelobe canceller for a multipath fading channel according to the present invention. The sidelobe canceller includes a main antenna system 10 and an array of auxiliary antenna systems $16_1$ through $16_n$. The main antenna system includes an antenna and a radio-frequency receiver for generating a baseband main channel signal, and each of the auxiliary antenna systems likewise includes an antenna and a radio-frequency receiver to produce baseband auxiliary channel signals. The auxiliary antennas are located so that their auxiliary channel signals $r_1, r_2, \ldots, r_n$ are uncorrelated with the main channel signal. Specifically, the auxiliary antennas are spaced apart from each other at intervals of the half wavelength of the carrier of the desired signal. The directivity of main antenna 10 is oriented toward the source of a desired signal. The output of main antenna 10 is connected to a complex multiplier 11 where the main channel signal is multiplied by a weight represented by a weight control signal "f" from a correlator 15 to produce an output signal $y_m$. This signal is applied to a summer 12, or diversity combiner whose output is connected to a subtractor 13 to produce a difference signal $y_z$. An adaptive equalizer 14 is connected to the output of subtractor 13 to cancel intersymbol interference that arises from the multipath fading channel and produces a decision output signal. Correlator 15 derives the weight factor "f" by cross-correlating the output signal R of main antenna 10 with the decision output of adaptive equalizer 14.

To the auxiliary antennas $16_1 \sim 16_n$ are connected a first array of complex multipliers $17_1 \sim 17_n$ and a summer 18 for sidelobe cancellation. Complex multipliers $17_1 \sim 17_n$ respectively scale the corresponding auxiliary channel signals $r_1, r_2, \ldots, r_n$ with weight coefficients represented by control signals $v_1, v_2, \ldots, v_n$ supplied from an Applebaum weight controller 19. The weighting of the first array is so performed that a resultant directivity of the auxiliary antennas is effectively oriented toward the source of a jamming signal, as indicated by a solid line pattern 44. The output signals of the complex multipliers $17_1 \sim 17_n$ are summed by summer 18 to produce an output signals $y_s$ which is a replica of the jamming signal. The output signal $y_s$ is applied to the subtractor 13 to provide sidelobe cancellation of the jamming component of the main channel signal R. As described in "Adaptive Arrays", Sidney P. Applebaum, IEEE Transactions on Antennas and Propagation, Vol., AP-24, No. 5, September 1976, each of the weights $v_k$ (where $k=1, 2, \ldots, n$) is derived by correlating the corresponding auxiliary signal with the output signal $y_z$ of the subtractor 13, subtracting the correlation from a corresponding steering vector component $t_k$, and then using a high gain amplifier. The steering vector is a set of values predetermined for causing the main lobe of the directivity pattern 44 to orient in the direction of an estimated source of the jamming signal.

More specifically, as illustrated in FIG. 2, the Applebaum weight controller comprises a correlator 30 for detecting correlations between the auxiliary channel signals $r_1, r_2, \ldots, r_n$ and the output signal $y_z$ from subtractor 13 to produce a set of n correlation signals. Subtractors 31 are respectively connected to the outputs of correlator 30 to respectively subtract the correlation signals from steering vectors $t_1, t_2, \ldots, t_n$ to produce "n" difference signals. Each difference signal is then amplified by an amplifier 32 with gain G to produce a weight control signal $v_k$ for the corresponding complex multiplier $17_k$.

For maximal diversity combining, a second array of complex multipliers $20_1 \sim 20_n$ are connected to the auxiliary antennas $16_1 \sim 16_n$ to respectively scale the auxiliary channel signals with weight coefficients represented by weight signals $w_1, w_2, \ldots, w_n$ supplied from a correlator 22. The weighting of the diversity combining array is so performed that a resultant directivity of the auxiliary antennas, as indicated by a broken-line pattern 45, is effectively oriented toward the source of the desired signal. The output signals of the complex multipliers $20_1 \sim 20_n$ are applied to a summer 21 to produce a replica of the desired signal. The replica of the desired signal detected in this way using the directivity pattern 45 is applied to the summer 12 where it is diversity-combined with the main channel signal at a maximum ratio. The weighting signals for multipliers 20 are derived by correlator 22 from the correlations between the decision output signal of adaptive equalizer 14 and the output signals of auxiliary antennas $16_1 \sim 16_n$.

Since the diversity combining effect of the present invention strengthen the desired signal, the lowering of the desired signal intensity due to the sidelobe cancellation is effectively eliminated.

For a full understanding of the present invention, a quantitative analysis of the sidelobe canceller is given below. The output signal R of the main antenna 10 is represented as:

$$R = h_1 \cdot S + g_1 \cdot J \quad (1)$$

where, the symbol (·) represents the vector product, $h_1$ is the transfer function of a path 40 from the source of a transmitted desired signal S to the main antenna, and $g_1$ is the transfer function of a path 42 from the source of a jamming signal J to the main antenna. The output signals of the auxiliary antennas $16_1 \sim 16_n$ are represented as a vector r which is in the form:

$$r = \begin{bmatrix} r_1 \\ r_2 \\ \cdot \\ \cdot \\ r_n \end{bmatrix} = h_2 \cdot S \cdot \begin{bmatrix} a \\ a\exp(-j\phi) \\ \cdot \\ \cdot \\ a\exp(-jn\phi) \end{bmatrix} + g_2 \cdot J \cdot \begin{bmatrix} b \\ b\exp(-j\theta) \\ \cdot \\ \cdot \\ b\exp(-jn\theta) \end{bmatrix} \quad (7)$$

where, $r_1, r_2, \ldots, r_n$ are the outputs of auxiliary antennas $16_1, 16_2, \ldots, 16_n$, respectively, a and b are scaler constants, $h_2$ is the transfer function of a path from the source of desired signal to the auxiliary antennas, $g_2$ is the transfer function of a path from the source of jamming signal to the auxiliary antennas, and $\phi$ and $\theta$ are the angles of arrival of the desired and jamming signals, respectively, to the auxiliary antenna $16_1$ which is taken as a reference auxiliary channel. By representing the $\phi$ and $\theta$ vector components as $U_d$ and $U_j$, respectively, $$U_d = a \begin{bmatrix} 1 \\ \exp(-j\phi) \\ \cdot \\ \cdot \\ \exp(-jn\phi) \end{bmatrix}, \quad (3a)$$

$$U_j = b \begin{bmatrix} 1 \\ \exp(-j\theta) \\ \cdot \\ \cdot \\ \exp(-jn\theta) \end{bmatrix} \quad (3b)$$

the product $S \times U_d$ represents the desired vector component with auxiliary antenna $16_1$ being taken as a reference. As a result, the amplitude of the desired vector component must be equal to the amplitude of the transmitted desired signal S, and hence, the amplitude of the vector $U_d$ is equal to 1. The scaler constant "a" of Equation (3a) is obtained as follows:

$$|U_d| - U_d^{1*} \cdot U_d = a^2[1 \exp(+j\phi) \ldots \exp(+jn\phi)] \cdot \quad (4)$$

-continued $$\begin{bmatrix} 1 \\ \exp(-j\phi) \\ \cdot \\ \cdot \\ \cdot \\ \exp(-jn\phi) \end{bmatrix} = n \times a^2 = 1$$

where the asterisk (*) represents the complex conjugate. Therefore, $$a = 1/\sqrt{n} \tag{5}$$

Likewise, the scaler constant "b" is given by:

$$b = 1/\sqrt{n} \tag{6}$$

Using Equations (3a) and (3b), the auxiliary vector component r is rewritten as:

$$r = h_2 \cdot S \cdot U_d + g_2 \cdot J \cdot U_j \tag{7}$$

By representing the weight vector of the second array as:

$$W = \begin{bmatrix} w_1 \\ w_2 \\ \cdot \\ \cdot \\ \cdot \\ w_n \end{bmatrix} \tag{8}$$

the output signal $y_d$ of the second array is given as follows:

$$\begin{aligned} y_d &= [r_1\ r_2 \ldots r_n] \cdot \begin{bmatrix} w_1 \\ w_2 \\ \cdot \\ \cdot \\ \cdot \\ w_n \end{bmatrix} = r^T \cdot W \\ &= (h_2 \cdot S \cdot U_d + g_2 \cdot j \cdot U_j)^T \cdot W \\ &= h_2 \times S \times U_d^T \cdot W + g_2 \times j \times U_j^T \cdot W \end{aligned} \tag{9}$$

Since adaptive equalizer 14 produces a replica of the transmitted desired signal S, the weight factor "f" derived by correlator 11 is given by:

$$\begin{aligned} f &= E[R^* \cdot S] \\ &= [[(h_1^* \times S^* + g_1^* xj^*) \cdot S] \\ &= h_1^* E[S^* \cdot S] + g_1^* E[j^* \cdot S] \end{aligned} \tag{10}$$

where E□ represents the estimation indicator which provides averaging over time. By normalizing the amplitude of the transmitted desired signal S to 1, the autocorrelation factor is given by:

$$E[S^* \cdot S] = 1 \tag{11}$$

Since the desired signal S and jamming signal J are uncorrelated, the following relation holds:

$$E[j^* \cdot S] = 0 \tag{12}$$

Therefore, Equation (10) can be rewritten as:

$$f = h_1^* \tag{13}$$

Using Equations (7) and (13), the output signal $y_m$ of complex multiplier 11 is in the form:

$$\begin{aligned} y_m &= R \cdot f \\ &= (h_1 \times S + g_1 \times j) h_1^* = h_1^* \times h_1 \times S + g_1 \times h_1^* j \end{aligned} \tag{14}$$

Likewise, the weight vector W of the correlator 22 is derived by correlating the replica of the desired signal S with the auxiliary channel signals r, giving the following relations:

$$\begin{aligned} W &= E[r^* \cdot S] \\ &= E[(h_2^* \times S^* \times U_d^* + g_2^* \times xj^* \times U_j^*) \cdot S] \\ &= h_2^* \times U_d^* \times E[S^* \cdot S] + g_2^* \times U_j^* \times E[j^* \cdot S] \\ &= h_2^* \times U_d^* \end{aligned} \tag{15}$$

Substituting Equation (15) into Equation (9) gives:

$$\begin{aligned} y_d &= h_2 \times S \times U_d^T \cdot h_2^* \times U_d^* + g_2 \times j \times U_j^T \cdot h_2^* \times U_d^* \\ &= h_2^* \times h_2 \times S \cdot U_d^T \times U_d^* + h_2^* \times g_2 \times U_j^T \times U_d^* \cdot j \end{aligned} \tag{16}$$

Since $U_d^T \times U_d^* = 1$ from Equation (4) Equation (16) can be rewritten as:

$$y_d - h_2^* \times h_2 \times S + h_2^* \times g_2 \times U_j^T \times U_d^* \cdot J \tag{17}$$

Using Equations (14) and (17), the output signal $y_c$ of the summer 12 is given by the following relation:

$$\begin{aligned} y_c &= y_m + y_d \\ &= (h_1^* \times h_1 + h_2^* \times h_2) S + \\ &\quad (g_1 \times h_1^* + h_2^* \times g_2 \times U_j^T \cdot U_d^*)] \end{aligned} \tag{18}$$

Note that the first term of Equation (18) contains $(h_1^* \times h_1 + h_2^* \times h_2)$. This implies that maximal diversity combining of the signals propagated over the paths 40 and 41 is achieved by weighting the main channel signal with the weight factor f, weighting the auxiliary channel signals with the weight vector w, and combining the weighted main and auxiliary signals by summer 11.

On the other hand, the output signal $y_s$ of the first array is given by:

$$y_s = r^T \cdot \begin{bmatrix} v_1 \\ v_2 \\ \cdot \\ \cdot \\ \cdot \\ v_n \end{bmatrix} \tag{19}$$

$$= (h_2 \cdot S \cdot U_d + g_2 \cdot j \cdot U_j)^T \cdot V -$$
$$h_2 \times S \times U_d^T \cdot V + g_2 \times j \times U_j^T \cdot V$$

where V is the weight vector $v_1, v_2, \ldots, v_n$. As a result, the output signal $y_z$ of subtractor 13 is given by:

$$Y_z = y_c - Y_s \tag{20}$$
$$= (h_1^* \times h_1 + h_2^* \times h_2 - h_2 \times U_d^T \cdot V)S +$$
$$(g_1 \times h_1^* + h_2^* \times g_2 \times U_j^T \times U_d^* - g_2 \times U_j^T \cdot V)j$$

Due to the sidelobe cancellation, the second term of Equation (20) is reduced to zero. The weight vector V is therefore represented as:

$$V = \{(h_1^* \times g_1/g_2) + h_2^*\} U_j^T + h_2^* \times U_d^* \tag{21}$$

The component $(h_2 \times U_d^T \cdot V)$ of the first term of Equation (20) may somewhat decrease the level of the desired signal to be obtained at the output of subtractor 13, and the actual optimum value would deviate from Equation (21). Because the optimal solution of the weight vector V exists in the neighborhood of the value of Equation (21), it maximizes the desired to undesired signal ratio by cancelling the jamming component by the Applebaum algorithm while preventing a decrease in the desired component.

In a practical embodiment, the adaptive tracking speed of the diversity combining array is higher than that of the sidelobe cancellation array in order to avoid a racing condition which might otherwise occur between the Applebaum weight controller 19 and correlator 22 for converging their weight vectors to optimum values. This tracking speed difference is carried out by setting the average processing time of the correlator 22 at a value smaller than that of the Applebaum weight controller 19. In this way, a diversity combining adaptive control process is performed to converge the weight vector W, then follows a sidelobe cancellation process to converge the weight vector V.

What is claimed is:

1. A sidelobe canceller comprising:

main antenna means for producing a baseband main channel signal and an array of auxiliary antenna means for producing baseband auxiliary channel signals;

a main channel multiplier for operating on the baseband main channel signal with a main channel weight signal and producing a weighted main channel signal;

a plurality of first auxiliary channel multipliers for respectively operating on said baseband auxiliary channel signals with sidelobe cancelling weight signals to produce first weighted auxiliary channel signals, and a first summer for summing the first weighted auxiliary channel signals to produce a first sum signal;

a plurality of second auxiliary channel multipliers for respectively operating on said auxiliary channel signals with diversity combining weight signals to produce second weighted auxiliary channel signals, and a second summer for summing the second weighted auxiliary channel signals to produce a second sum signal;

diversity combining means for summing the second sum signal with said weighted main channel signal to produce a diversity combined main channel signal;

subtractor means for subtracting said first sum signal from said diversity combined main channel signal;

an adaptive equalizer connected to said subtractor means for producing a decision output signal;

main channel weight control means for detecting a correlation between the decision output signal and the baseband main channel signal and deriving said main channel weight signal from the detected correlation;

first auxiliary channel weight control means for deriving said sidelobe cancelling weight signals so that said auxiliary antenna means have a first directivity pattern whose main lobe is oriented toward an undesired signal; and second auxiliary channel weight control means for deriving said diversity combining weight signals so that said auxiliary antenna means have a second directivity pattern whole main lobe is oriented toward a desired signal.

2. A sidelobe canceller as claimed in claim 1, wherein said first auxiliary channel weight control means comprises:

means for detecting correlations between said baseband auxiliary channel signals and the output signal of said subtractor means; and a plurality of subtractors for respectively subtracting the detected correlations from predetermined values and producing therefrom said sidelobe cancelling weight signals, wherein said second auxiliary channel weight control means comprises means for detecting correlations between said decision output signal and said baseband auxiliary channel signals and deriving said diversity combining weight signals from the detected correlations.

3. In a sidelobe canceller comprising:

main antenna means for producing a baseband main channel signal and an array of auxiliary antenna means for producing baseband auxiliary channel signals;

a main channel multiplier for operating on the baseband main channel signal with a main channel weight signal and producing a weighted main channel signal;

a plurality of first auxiliary channel multipliers for respectively operating on said baseband auxiliary channel signals with sidelobe cancelling weight signals to produce first weighted auxiliary channel signals, and a first summer for summing the first weighted auxiliary channel signals to produce a first sum signal;

a plurality of second auxiliary channel multipliers for respectively operating on said auxiliary channel signals with diversity combining weight signals to produce second weighted auxiliary channel signals, and a second summer for summing the second weighted auxiliary channel signals to produce a second sum signal;

diversity combining means for summing the second sum signal with said weighted main channel signal to produce a diversity combined main channel signal;

subtractor means for subtracting said first sum signal from said diversity combined main channel signal;

main channel weight control means for detecting a correlation between the decision output signal and the main channel signal and deriving said main channel weight signal from the detected correlation; and an adaptive equalizer connected to said subtractor means for producing a decision output signal, a method comprising the steps of:

a) detecting correlations between said decision output signal and said baseband auxiliary channel signals;

b) subtracting the correlations detected by the step (a) from predetermined values respectively to produce difference signals;

c) updating said diversity combining weight signals according to said difference signals respectively;

d) detecting correlations between said baseband auxiliary channel signals and the output signal of said subtractor means; and e) updating said sidelobe cancelling weight signals according to the correlations detected by the step (d), and repeating the steps (a) to (e).

* * * * *